Dec. 10, 1957     D. E. PRITCHETT     2,816,033
DEBITTERING NAVEL ORANGE JUICE
Filed April 18, 1955     3 Sheets-Sheet 1

INVENTOR.
DAVID E. PRITCHETT
BY
AGENT

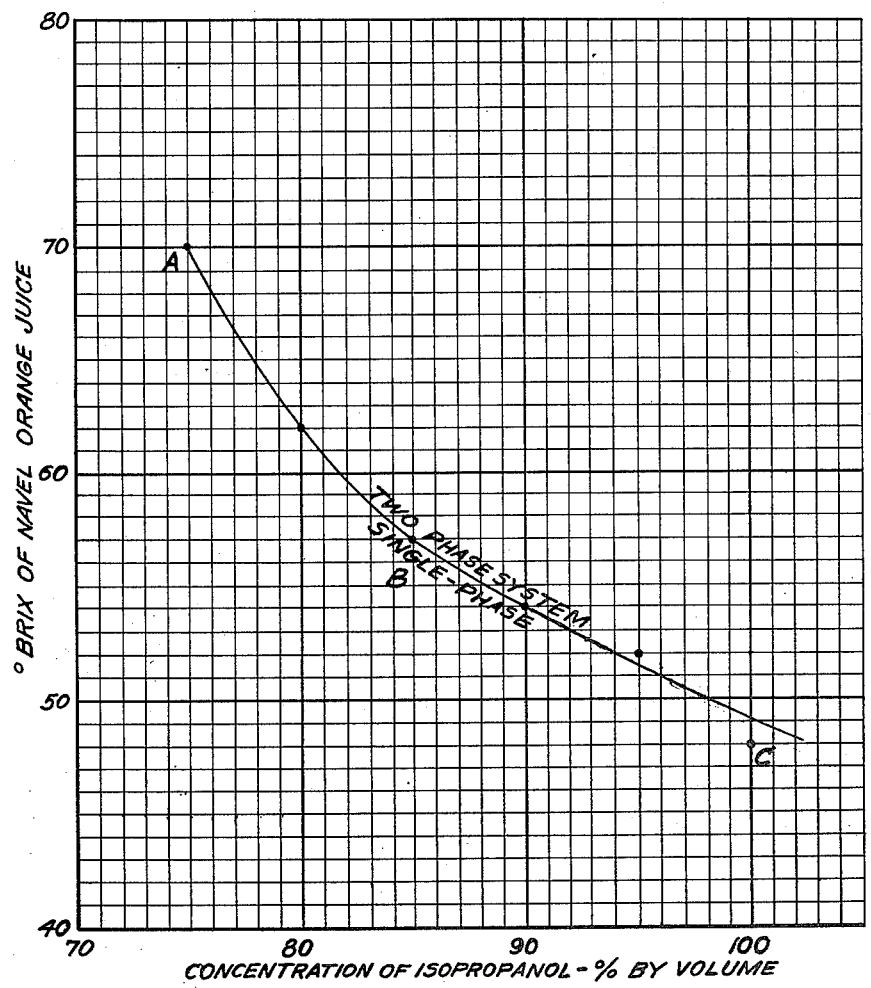

United States Patent Office 2,816,033
Patented Dec. 10, 1957

2,816,033

DEBITTERING NAVEL ORANGE JUICE

David E. Pritchett, Ontario, Calif., assignor to Sunkist Growers, Inc., Los Angeles, Calif., a corporation of California Application April 18, 1955, Serial No. 501,789

15 Claims. (Cl. 99—105)

This invention relates to the debittering of navel orange juice to render it acceptable for consumption as such or for utilization in orange juice products.

More particularly, it applies to the extraction of the bitter principle characteristically present in the navel orange from single strength extracted juice or from a concentrate of the juice. This is preferably accomplished by: (1) separation of the juice into a serum and a pulpy residuum, (2) solvent extraction of bitter constituents from the residue, (3) separation of bitter constituents from the serum by filtration, adsorption or extraction, (4) recombination of the serum and the pulpy residuum and (5) distillation to remove residual traces of the solvent employed.

It is well known that navel oranges, especially those which are not completely mature, contain the precursor of a bitter principle which though not bitter itself is responsible for the development of bitterness in navel orange juice. Although a freshly extracted juice is not detectably bitter, objectionable bitterness begins to develop upon extraction of the juice and becomes more noticeable with the passage of time. As a result it has not been possible to utilize navel juice in the production of orange juice items aceptable to the average consumer.

Since my invention permits navel oranges to be used in the preparation of commercial products, it assures complete economic consumption of the grower's crop and is of great importance to navel orange growers and to consumers.

It is therefore a major object of this invention to accomplish the debittering of navel orange juice so that it may be employed in the preparation of commercial products.

It is a further object of this invention to extract the bitter principle from navel orange juice without materially impairing the color, taste, cloud stability, citric acid content or ascorbic acid content of the juice.

Although the bitter principle has been identified by some writers as nomilin or isolimonin, it is more generally believed that the compound responsible for bitterness in navel orange juice is limonin, whose chemical formula is $C_{26}H_{30}O_8$ and whose molecular structure is not at this time known. It is thought that development of bitterness in navel juices is the result of hydrolysis of the precursor of limonin, a nonbitter, water soluble potassium salt of limonin, to form a bitter lactone substance. Irrespective of whether the bitter principle is limonin, isolimonin or nomilin, a combination of these, or some other chemical compound, I have discovered that bitter constituents can be effectively removed from navel juice through utilization of my process.

My invention will be more specifically disclosed with reference to the drawings in which:

Figure 3 is a representation of a curve defining the area in which a two phase liquid system may be obtained with isopropanol and concentrated navel orange juice.

Figure 1:
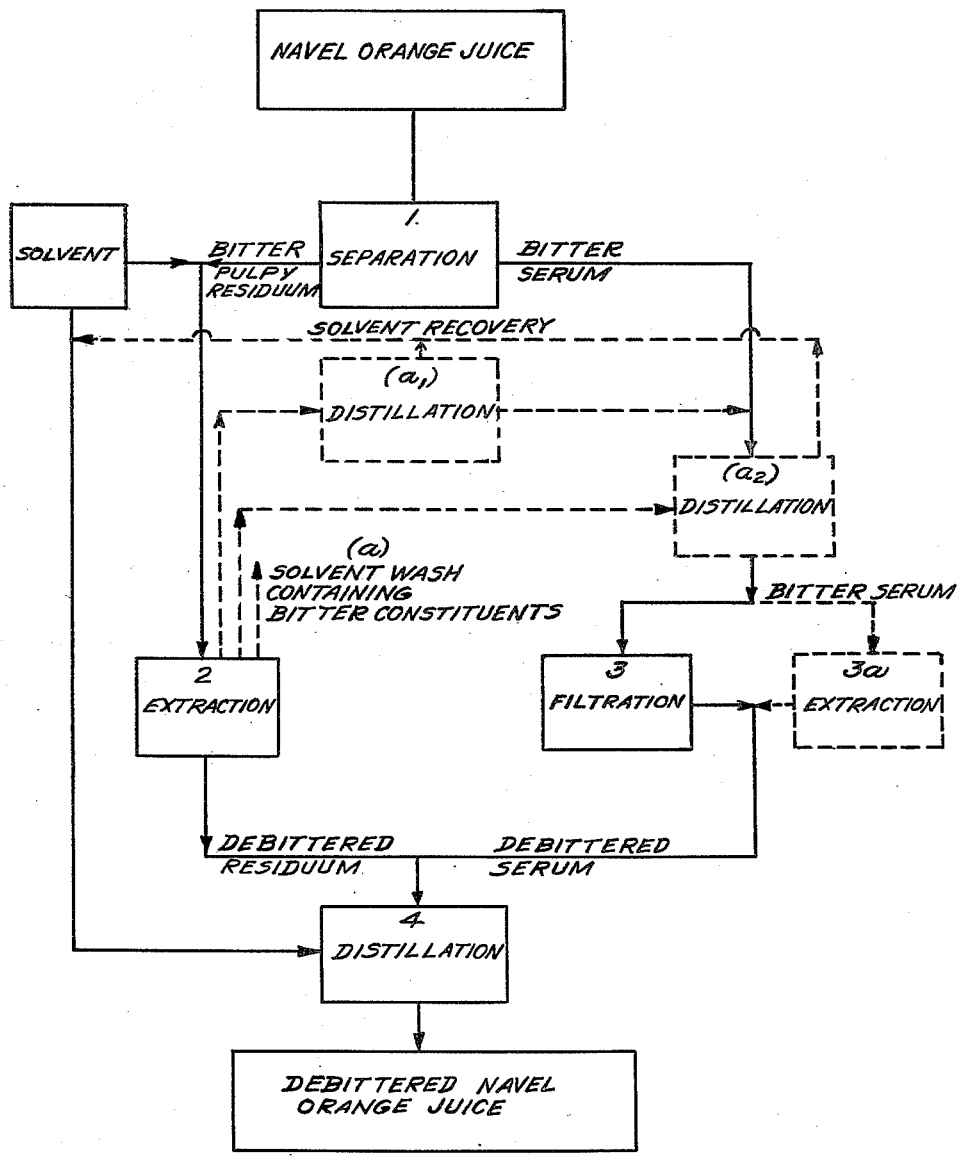
Figure 1 is a flow sheet of my basic process.

As indicated by the heavy lines of Figure 1, the invention resides broadly in the separation of single strength juice into a pulpy residuum and a serum or liquid portion, extraction of the bitter principle from the residuum by washing with a suitable solvent such as isopropanol, removal of the bitter principle from the serum by adsorbent treatment and filtration, recombination of the debittered residuum and serum, and removal of traces of solvent by distillation.

The physical separation step indicated at 1 in Figure 1 may be accomplished in any suitable manner without adversely influencing the final product. Separation may be carried out, for example, by decantation after gravity separation, by filtration, centrifugation, or through use of a separator. All that is necessary is that a major portion of the pulp and insoluble materials be separated from the liquid portion so that the desired solids will not be lost as a result of the adsorbent filtration step indicated by 3. The effectiveness of separation will govern the subsequent taste, cloud stability and color of the debittered juice. As evident from Figure 1, step 2, the residuum is treated or washed with a solvent material which will remove the bitter constituents. The added solvent and dissolved bitter substances can, of course, be removed in any of the manners set forth above with reference to step 1 except for filtration. In adition the solvent can be added to the juice before separation step 1 in which event the pulpy residuum resulting needs no further extraction while the serum requires distillation before bitter can be extracted. The serum is separately treated for removal of the bitter constituents by the addition of an adsorbent and subsequent filtration to remove the adsorbent and bitter principles. Alternatively as indicated for step 3a by the broken lines, the bitter constituents may be removed from the serum by extraction with an immiscible solvent which is separated from the juice or liquid by decantation, centrifugation, or by use of a separator.

The debittered residuum and serum are then recombined and distilled to insure complete removal of all traces of solvent. Vacuum distillation is preferred since the higher temperatures needed for ordinary distillation tend to cause unfavorable cooked tastes to result, but ordinary distillation is feasible so long as excessive distillation temperatures are not required. The result is a juice product which is and will remain devoid of the bitter taste characteristic of navel juice which has been allowed to stand for an appreciable length of time.

The essential manipulative steps of my basic process are shown as above noted by the heavy lines in Figure 1, while the broken lines designate optional steps and directions of flow. The line (a), for example, indicates that the solvent wash material which contains the bitter constituent may be removed from further treatment in the process and either discarded or treated to recover solvent and bitter principles. The distillation of ($a_1$) may alternatively and optionally be carried out to remove solvent from the pulp washings which will then be introduced to the serum prior to the filtration or extraction of step 3. Or as further optional treatment of the wash liquid, it may be incorporated with the serum resulting from the separation of step 1, and then distilled as indicated at ($a_2$) before the bitter constituents are removed from the distilland and serum in step 3.

The result of my process is the same whether the pulp washings are subsequently treated as in ($a_1$) or ($a_2$) or whether they are discarded as shown by (a), since the amount of color, cloud material, ascorbic acid and other constituents recovered through steps ($a_1$) or ($a_2$) is negligible.

Since the substances primarily responsible for satisfactory taste, color and cloud stability are present as insolubles, the desirability of a debittered product will depend in great measure upon the success attained in removing the pulp and insoluble materials from the liquid or juice portion. If the pulp is not adequately separated from the serum before the bitter constituents extraction step, these insolubles will be removed from the serum with the bitter substances and lost to the product. The process of Figure 1 is satisfactory from this standpoint for both natural strength and concentrated juices and is the preferred process for treating natural strength juice.

Figure 2:
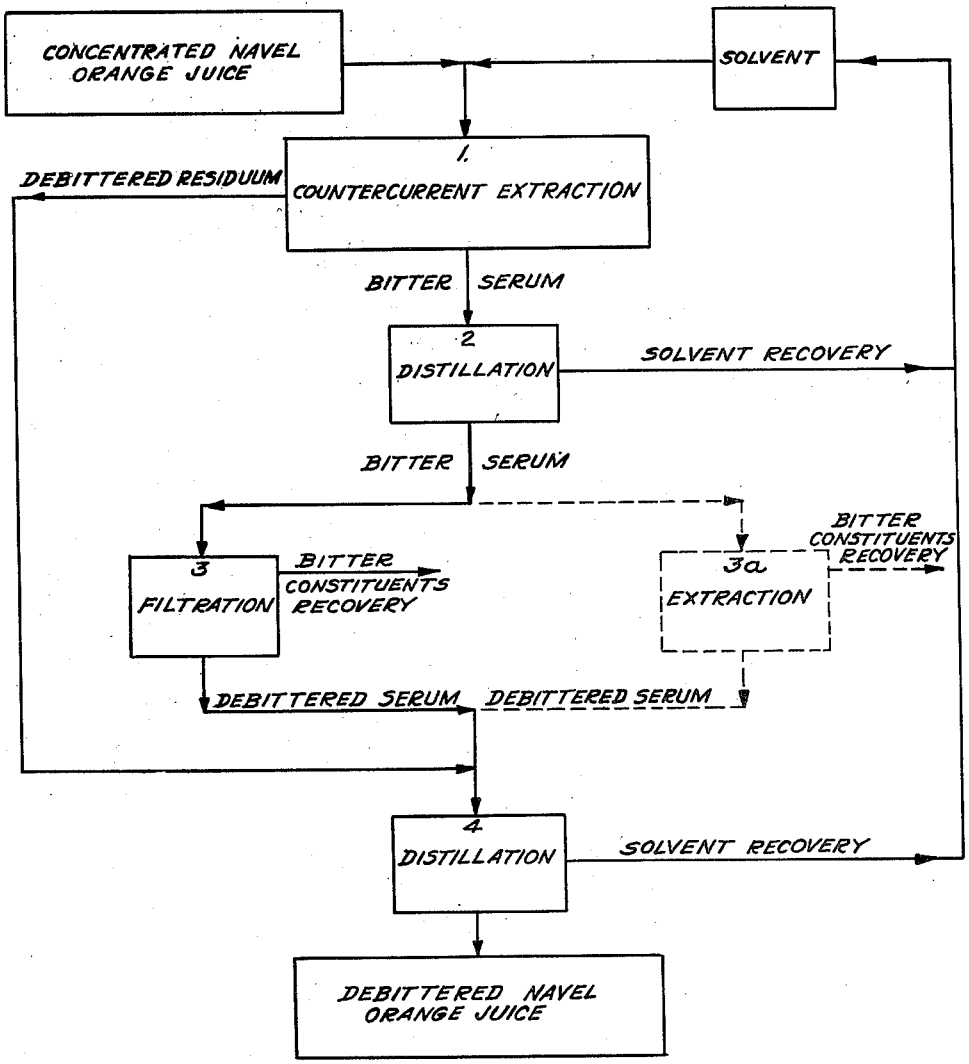
Figure 2 is a flow sheet of a preferred and further refined process for removing bitterness from concentrated navel orange juice.

I have discovered, as illustrated by Figure 2, a preferred process for accomplishing this separation and for producing a greatly improved debittered navel orange juice. This process depends for its success upon my discovery that concentrated navel orange juice forms a two phase liquid system with various solvents for the navel bitter constituents. One of these phases is predominantly solvent in content, while the other is predominantly water in content.

Addition of the appropriate solvent to concentrated juice precipitates or flocculates those pectinous substances which are normally present in the juice as colloidally dispersed particles and occludes the cellulosic and other materials which comprise the cloud. The resulting precipitate or flocculated mass settles into the water predominant phase.

The solvent phase will, of course, contain the solvent soluble bitter constituents as well as very limited amounts of naturally occurring sugars and other solubles. The solvent phase thus may be separated from the water phase without removing undesirable amounts of color, sugars, vitamins and other substances. Although a two phase liquid system is not ordinarily formed when treating natural strength juice as it is when concentrated juice is treated, addition of solvent to natural strength juice does nevertheless aid in the separation of the pulpy portion from the liquid, since the solvent tends to cause flocculation and agglomeration of the cloud.

In my preferred embodiment a countercurrent extraction indicated as step 1 in Figure 2 is substituted for both separation and residuum extraction steps 1 and 2 of the process illustrated by Figure 1. This is possible because the flow of solvent past a concentrated juice not only removes the bitter constituents from the liquid portion of the juice and forms a two phase liquid system, but also extracts them from the insoluble pulpy residue. As is evident, the preferred process of Figure 2 requires, prior to separation into a serum and a pulpy residuum, the addition of the solvent which causes formation of the two phase liquid system in the concentrate. The serum resulting from the separation of step 1 is, of course, composed in large part of the solvent material added to the juice before separation. In order to remove the bitter principles from the serum it is necessary to remove the solvent to permit adsorption of the bitter constituents in the filtration step or to permit extraction of these constituents with the immiscible solvent utilized. This is accomplished by a distillation step indicated by 2 in Figure 2 which may be either an ordinary distillation or a vacuum distillation, so long as the temperature of the juice is not raised to the point where cooked or off tastes will result. The removed solvent is condensed and returned to solvent storage.

At this point debittering of the serum is preferably accomplished by treatment of the juice with an adsorbent agent capable of adsorbing the bitter principle and subsequent filtration to remove the adsorbent and bitter principle as indicated by step 3 of the drawing. The same result can be accomplished by extraction of the bitter principle from the juice with an immiscible solvent which will dissolve the bitter constituents and which can be separated from the juice or liquid portion by decantation, centrifugation, or other appropriate means. It should be noted that the use of an adsorbent agent though highly desirable is not absolutely essential, since ordinary filtration will remove the major portion of the bitter constituents. The debittered pulp is introduced to the debittered juice or liquid portion at this point. The subsequent distillation of step 4 is accomplished solely to remove the last traces of the solvent employed in order to avoid any foreign or extraneous tastes. The resulting debittered navel orange juice is suitable for consumption as such or for use in any products containing orange juice.

In order to more effectively illustrate the broad process of Figure 1, the following example is presented:

Freshly extracted juice was divided into four samples, one of which served as a control, the other three being treated identically, except for the initial separation of the juice into a serum and a pulpy portion. A liter of the juice of sample No. 1 was mixed with an equal volume of 99.6% isopropanol and the insoluble materials removed therefrom in a separator. This pulpy material was washed with one liter of 50% isopropanol which was then removed from the pulp in a separator and recombined with the serum. The separator was flushed with an additional 500 ml. of isopropanol which was also combined with the serum. The serum was then vacuum distilled to remove the alcohol and to precipitate the bitter principles. The residual liquid from the distillation step was treated with 8 grams of activated char and then filtered. The filtrate and washed pulpy portion were recombined and vacuum concentrated to remove the last traces of alcohol.

Samples Nos. 2 and 3 were treated identically except that the volume of alcohol used with the one liter juice volume of sample 2 was 500 ml., and sample 3 had no isopropanol added to it before the pulpy residuum was removed from the juice in the separator. Sample 3 was thus treated in the manner indicated by Figure 1. The juice of sample 4, the control, was merely concentrated by the vacuum distillation steps utilized for samples 1, 2 and 3.

The results of taste tests on the above samples showed that natural strength juice may be debittered without the use of alcohol or other solvent, except for washing the pulp after the initial separation step. Although sample 3 was slightly preferred over the other samples, the process which separates the pulp from the juice without added alcohol or other solvent had been anticipated to be somewhat disadvantageous because of the possibility of a greater loss of cloud. The addition of alcohol prior to any treatment precipitates or agglomerates the colloidal pectic substances primarily constituting the cloud of the citrus juice and therefore permits a clean separation of the pulp and cloud from the clarified juice. Surprisingly enough sample 3, which was separated without the use of the solvent, had a very satisfactory cloudy appearance when reconstituted to 12° Brix. The advantages of debittering natural strength orange juice, in the manner illustrated in Figure 1, are the elimination of an absolute need for recovering alcohol from the main portion of the juice and a reduction in the quantity of alcohol required for the process with a consequent reduction in the cost of the process.

Whether a solvent is or is not utilized in the debittering of natural strength juice to obtain its physical separation into a serum and a residuum, the serum will contain those sugars and other substances responsible for the color, taste and food value, while the pulpy portion will contain those substances primarily responsible for the cloudy appearance of the final product.

On the other hand when concentrated juice is physically separated with the aid of a solvent, the sugars and other chemical substances responsible for color and taste will be present in insoluble form, or as soluble constituents of the water phase in which they are more soluble than they are in the solvent phase. Consequently they are separated with the pulpy residue while the serum contains so little ascorbic acid, sugars and other food values, that it can be discarded without an unduly detrimental effect upon the final product. Since, however, the serum contains almost all of the solvent initially introduced, efficient commercial operation requires that the solvent be recovered or that the separated serum be utilized in the next batch separation of the concentrated juice.

While a batch process may be employed even in the treatment of concentrated juice where the step 1 separation is accomplished by decantation, filtration, or through use of a centrifuge or a separator, the ease with which a two phase system is formed when various solvents are added to the concentrated juice indicates the desirability of employing a countercurrent extractor to accomplish both the separation of the concentrated juice into a serum and a pulpy residuum, and the extraction of the bitter principle from the pulpy residuum.

To illustrate the debittering of concentrated juice through use of a countercurrent extractor, fresh natural strength navel orange juice, which had been fine screened, was concentrated in a low temperature vacuum pan to 65° Brix and then separated into two samples, one for treatment and one for control. The process was carried out in laboratory apparatus constructed as indicated. An extraction column was made of a glass pipe 70 inches in length and 3 inches in inside diameter which had, at the top of the column, a diffusion head whose openings were .02 inch and which had a solvent inlet at the bottom. A serum outlet was located above the diffusion head, while a residue outlet was located below the solvent inlet. Debittering was accomplished by passing the concentrate of the sample through the diffusion head at a rate of 200 ml. a minute, while isopropanol was introduced through the solvent inlet at 200 ml. per minute. The resulting serum was removed from the extractor and vacuum distilled in order to remove the isopropanol. The residue was treated with activated char and filtered, the char filtration removing the bitter principle from the serum. The filtrate was then recombined with the pulp from the extractor and the product vacuum distilled to remove the last traces of alcohol. The distillation residue was identified as sample 2.

The results of the above concentrate debittering process showed that bitter constituents can be removed from navel orange juice concentrate without seriously affecting the citric acid and ascorbic acid content. Sample 1, the control, was found to be bitter and unacceptable while sample 2, the treated juice, was found to be nonbitter and acceptable. The debittering process thus removed the bitter constituents of the juice and rendered an unacceptable juice suitable for consumption as such or for use in products containing orange juice.

Countercurrent extraction requires for efficient operation the formation of the two phase liquid system in order to obtain separation of the serum and the pulpy portion. Concentrated navel orange juice does not form such a two phase liquid system with all concentrations of the solvent employed.

Figure 3 illustrates the minimum strength of isopropanol in percent by volume which is necessary to the formation of a two phase liquid system with concentrations of navel orange juice from about 48° Brix to about 70° Brix. The points defining curve ABC were determined by mixing equivalent amounts of a particular concentration of juice with the solvent, shaking the mixture moderately by hand for 30 seconds and observing for separation. The strength of the solvent was altered in 2% increments to determine the isopropanol concentration necessary for two phase formation. The area above the curve ABC represents concentrations of alcohol and navel orange juice forming a two phase system which may be satisfactorily treated by the countercurrent extraction method, while the area below the curve ABC represents concentrations of alcohol and navel orange juice which form no two phase system and which hence cannot be treated by countercurrent extraction. While no determinations were made for juice below 48° Brix, it seems evident that curve ABC will continue to values below 48° Brix upon the addition to the navel orange juice of more than equal amounts of 100% isopropanol. While the curve is sufficiently illustrative for purposes of commercial countercurrent extraction, the lower limitation upon the amount and concentration of isopropanol required for any concentration of juice is dependent only upon the formation of a two phase liquid system. In other words the critical amount of solvent necessary for countercurrent extraction is the minimum concentration which will give a two phase liquid system with the particular juice concentrate to be debittered.

My invention is not limited to the discovery that isopropanol may be satisfactorily utilized in the debittering of both single strength and concentrated navel juice but extends to the broad discovery that many chemical substances of the solvent class are suitable for such use. Of course, the primary requisite for such a solvent is that it must have, in minor dilutions with water, the ability to dissolve the bitter constituents of navel orange juice. Quite clearly a solvent which does in fact have solvent abilities with respect to such bitter constituents in the absence of dilution with water but does not act as a navel bitter constituent solvent upon dilution is not satisfactory since the mere addition of the solvent to natural strength or concentrated juice results in its dilution with water.

A further requirement is that color and flavor constituents be relatively insoluble in minor water dilutions of the solvent. It is not essential that these materials be absolutely insoluble in such solvent because minor loss of these constituents can be tolerated without adverse effect on the final product.

The appropriate solvent should also have no solvent action with respect to pectin since rendering the pectinous constituents of the navel juice soluble would result in their removal with the bitter. The final product would in such event be a perfectly clear serum having little if any resemblance to orange juice. It is therefore of importance that a nonsolvent for pectin be employed.

Furthermore the solvent must not chemically react with any of the constituents of navel orange juice or cause them to react chemically.

It is also desirable that the solvent have a low boiling point, preferably below 100 C., or else form a low boiling point constant boiling mixture with water. If the solvent boils at a temperature considerably above that of water or otherwise cannot be removed from the serum or debittered juice without utilization of high temperatures, the distillation step will impart cooked or off tastes to the juice product.

The desired solvent can thus be defined as an orange juice inert navel bitter constituent solvent in which pectin, orange juice color and flavor components are relatively insoluble and which can be distilled from orange juice at relatively low temperatures. Solvents having these characteristics are referred to in the claims as a navel bitter selective solvent.

Although all solvents falling within the above category may be satisfactorily utilized in the debittering of natural strength juice through the process of Figure 1, they are not all necessarily satisfactory for utilization in the concentrated juice debittering process of Figure 2 which requires two phase formation for its success. The important limitation on the suitability of a solvent for the process of Figure 2 is its ability to form a two phase liquid system with the concentrated juice. It has been determined that a solvent will not form a two phase liquid system with concentrated juice unless sucrose is substantially insoluble in the solvent. A solvent which is satisfactory for employment in the concentrate debittering process can thus be referred to as a navel bitter selective solvent which is a nonsolvent for sucrose.

In order to verify this concept of operativeness of various solvents, debittering of both natural strength and concentrated juices was accomplished in the manner previously indicated except that for the concentrated juice countercurrent extraction was not employed. Instead the solvent phase or serum of the juice was separated by decantation after gravity settling and the residuum washed with the solvent. The remaining procedural steps were the same.

Amongst the solvents having the required characteristics, which will in fact debitter both concentrated and natural strength navel orange juice, are methyl-ethyl ketone, tertiary butanol, methyl acetate, isopropanol and acetone. Although tertiary butanol effects debittering, it suffers from the defect that color and nutrient factors are sufficiently soluble therein to be extracted from the juice, rendering it somewhat pale and undesirable for some uses. Methyl-ethyl ketone and methyl acetate tend to extract color and nutritive substances from the juice in slightly greater degree than is desired for most product uses. In addition to the above solvents methanol and ethanol may very satisfactorily be employed in the debittering of natural strength juice but may not, as indicated by the solubility of sucrose therein, be employed in the concentrate process.

Of the solvents recited it is preferred because of economic considerations to use isopropanol for both the single strength and the concentrated juice debittering.

With more specific reference to the actual removal of the bitter substance or substances from the serum in step 3 of the process of Figure 1 or Figure 2, examples of removal by both filtration and by extraction will be given.

In order to determine the effectiveness and necessity for the use of adsorbent materials in treating the serum or solvent extract of the juice to remove bitter constituents a bitter serum obtained from the countercurrent extraction process was distilled to remove all traces of the solvent and then diluted to 20° Brix prior to the filtration or extraction treatment. The bitter, solvent free, 20° Brix serum was divided into seven samples which were treated variously by simple filtration, addition of .1% of adsorbent agents such as activated char, fuller's earth, bentonite and subbentonite with subsequent filtration, and by extraction with benzol. Sample 7, which exemplified the removal of bitterness from the serum by solvent extraction, was extracted with .3 volume of benzol which was removed from the serum through use of a separator. In order to remove residual traces of benzol from the serum, it was, of course, necessary to distill the extracted serum and then readjust the degrees Brix to 20 to assure accurate comparative results.

Although it is difficult to accurately determine distinctions between the amount of bitter substance removed from various samples of navel orange juice, it was nevertheless evident from the tests performed that a simple filtration was sufficient to remove bitterness from the navel juice and to thereby render it commercially acceptable. However, in view of the small amounts of adsorbent materials required to remove bitterness from navel orange juice to a somewhat greater degree than is possible with simple filtration, it is preferred to add such an adsorbent material to the serum after solvent distillation and prior to filtration.

With regard to the extraction of bitter constituents from the serum, benzol is merely exemplary of those immiscible solvents which can be used in my process. Toluene and ethylene chloride are others which belong to the immiscible bitter constituent solvent class suitable for such extraction. Whether extraction or filtration is employed to remove the bitter constituents from the serum is not critical but depends upon whether it is desired to recover the bitter constituents and upon the particular process desired for recovering those constituents. It is preferred to employ filtration since this is a less costly process.

In view of the fact that the degree of bitterness increases as a function of time from the moment of extraction of the juice, it was contemplated that it might possibly be necessary to retain the juice in storage for a time sufficient to obtain the complete development of bitterness before proceeding with the process. It has, however, been determined that my debittering process may be started immediately upon extraction of the juice and still succeed in extracting the bitter constituents of navel orange juice. This conclusion is based upon the immediate debittering of freshly extracted navel orange juice by treatment with an equal volume of 99.6% isopropanol, separation into a serum and a pulpy residuum in a laboratory separator, extraction of the residuum with ¼ the original volume of 50% isopropanol and separation of the isopropanol in a laboratory separator, distillation of the serum to remove isopropanol, addition of activated char to the serum with subsequent filtration, recombination of the washed pulpy residuum and filtered serum and distillation to a concentration of about 35° Brix to remove residual traces of isopropanol. A second sample was similarly treated except that debittering was not begun until 24 hours after extraction. A third sample was untreated except for concentration to about 35° Brix. The control sample was found to have an unpalatable bitterness while both samples 1 and 2 were devoid of bitterness.

The above results illustrate that my process may be instituted immediately upon extraction; that time is of no criticality in the practice of my process.

Having described my invention in such full, clear and exact terms as to enable others skilled in the art to practice it, I claim as my invention:

1. A process for debittering navel orange juice comprising; selectively dissolving bitter constituents present in navel orange juice by adding a solvent thereto, removing the dissolved bitter constituents from the insoluble components of said juice by separating the resulting orange juice and solvent liquor into a serum and a pulpy residuum, precipitating said bitter constituents by distilling said solvent from said serum, removing said bitter constituents by separating them from the distilland resulting from said distillation to obtain a debittered distilland, recombining said debittered distilland and said pulpy residuum, and removing final traces of said solvent by distilling the recombined debittered distilland and pulpy residuum to produce a debittered navel orange juice.

2. A process for debittering navel orange juice comprising; adding an orange juice inert navel bitter constituent solvent to navel orange juice, said solvent being characterized by the relative insolubility of pectin, orange juice color and flavor components therein, separating the resulting orange juice and solvent liquor into a serum and a pulpy residuum, distilling said serum to remove said solvent, separating the bitter constituents present in the distilland of said serum from said distilland, recombining the debittered distilland of said serum and said pulpy residuum, and distilling the recombined debittered distilland of said serum and said pulpy residuum to remove final traces of solvent to produce a debittered navel orange juice.

3. A process for debittering navel orange juice comprising; separating navel orange juice into a serum and a first pulpy residuum, adding an orange juice inert navel bitter constituent solvent to said pulpy residuum to give a residuum-solvent mixture, said solvent being characterized by the relative insolubility of pectin, orange juice color and flavor components therein, separating said residuum-solvent mixture to give a second pulpy residuum and a solvent extract, separating navel bitter constituents from said serum, recombining said serum and said second pulpy residuum, and distilling said recombined serum and second pulpy residuum to remove final traces of solvent to produce a debittered navel orange juice.

4. The process of claim 3 in which the separation of navel bitter constituents from said serum is accomplished by filtration of said serum.

5. The process of claim 3 in which the separation of navel bitter constituents from said serum is accomplished by addition of an adsorbent agent to said serum and filtration of the serum-adsorbent agent mixture.

6. The process of claim 3 in which the separation of navel bitter constituents from said serum is accomplished by liquid extraction of said serum with an immiscible navel bitter selective solvent.

7. The process of claim 3 in which said solvent extract is distilled and the distilland combined with said serum.

8. A process for debittering navel orange juice which comprises; countercurrent extraction of concentrated navel orange juice with an orange juice inert navel bitter constituent solvent, said solvent being characterized by the relative insolubility of pectin, orange juice color and flavor components therein, to give a solvent containing serum and a pulpy residuum, distilling said solvent containing serum to give a substantially solvent free distilland, separating navel bitter constituents from said distilland, adding said residuum to said distilland to give a distilland-residuum liquor, and distillation of said liquor to remove final traces of solvent to produce a debittered navel orange juice.

9. The process of claim 8 in which the separation of navel bitter constituents from said serum is accomplished by filtration of said serum.

10. The process of claim 8 in which the separation of navel bitter constituents from said serum is accomplished by addition of an adsorbent agent to said serum and filtration of the serum-adsorbent agent mixture.

11. The process of claim 8 in which the separation of navel bitter constituents from said distilland is accomplished by liquid extraction of said distilland with a navel bitter constituent solvent immiscible in orange juice.

12. A process for debittering navel orange juice which comprises; passing concentrated navel orange juice countercurrent to a flow of orange juice inert navel bitter constituent solvent selected from the group consisting of isopropanol, methyl-ethyl ketone, teritary butanol, methyl acetate and acetone to give a solvent containing serum and a pulpy residuum, distilling said serum to remove said solvent, filtering said serum to remove navel bitter constituents to give a debittered serum, recombining said debittered serum with said residuum and distillation of the recombined residuum and serum to remove final traces of solvent to produce a debittered navel orange juice.

13. A process for debittering navel orange juice which comprises passing concentrated navel orange juice countercurrent to a flow of an orange juice inert navel bitter constituent solvent selected from the group consisting of isopropanol and acetone to give a solvent containing serum and a pulpy residuum, distilling said serum to remove said solvent, adding an immiscible bitter constituent solvent selected from the group consisting of benzol, ethylene chloride and toluene to said serum to give a serum-immiscible solvent mixture, agitating said serum-immiscible solvent mixture, separating said serum-immiscible solvent mixture to obtain a substantially solvent free debittered serum, recombining said debittered serum with said residuum and distilling the recombined serum-residuum mixture to remove final traces of solvent to produce a debittered navel orange juice.

14. A process for debittering navel orange juice which comprises; adding a navel bitter constituent solvent selected from the group consisting of ethanol, methanol, isopropanol and acetone to navel orange juice to obtain an orange juice-solvent liquor, separating said liquor into a solvent containing serum and a pulpy residuum, distilling said serum to remove said solvent to obtain a solvent-free distilled serum, separating the navel bitter constituents from said solvent-free distilled serum, extracting navel bitter from said residuum with said navel bitter constituent solvent to obtain a debittered residuum, combining said debittered residuum and said serum and distilling said combined debittered residuum and said serum to remove solvent to produce a debittered navel orange juice.

15. A process for debittering navel orange juice which comprises; passing concentrated navel orange juice countercurrent to a flow of isopropanol to obtain an isopropanol containing serum and a pulpy residuum, distilling said serum to remove isopropanol therefrom, adding an adsorbent agent to said serum and filtration thereof to remove said adsorbent agent together with adsorbed bitter constituents to obtain a filtered serum, combining said pulpy residuum with said filtered serum and distilling the filtered serum-pulpy residuum mixture to remove final traces of isopropanol to produce a debittered navel orange juice.

References Cited in the file of this patent

UNITED STATES PATENTS

| | | |
|---|---|---|
| 950,950 | Oehme | Mar. 1, 1910 |
| 1,840,798 | Tressler | Jan. 12, 1932 |
| 2,374,219 | Lee | Apr. 24, 1945 |
| 2,485,279 | Giniewski | Oct. 18, 1949 |
| 2,506,776 | Carnarius | May 9, 1950 |
| 2,510,797 | Burdick et al. | June 6, 1950 |
| 2,712,008 | Kirchner | June 28, 1955 |